United States Patent [19]
Von Hollen

[11] 3,751,176
[45] Aug. 7, 1973

[54] COMPOSITE BIT

[75] Inventor: John Von Hollen, Cedar Grove, N.J.

[73] Assignee: Von Hollen Tool Company, Inc., Cedar Grove, N.J.

[22] Filed: Dec. 21, 1970

[21] Appl. No.: 99,844

[52] U.S. Cl............. 408/144, 408/226, 83/698, 51/206, 32/48, 29/95
[51] Int. Cl............................ B23b 51/00
[58] Field of Search............... 408/238, 239, 226, 408/144; 279/103, 105; 51/206; 32/48; 83/698; 29/95, 95 C

[56] References Cited
UNITED STATES PATENTS

| | | | |
|---|---|---|---|
| 3,251,605 | 5/1966 | Ondeck | 408/239 X |
| 3,429,350 | 2/1969 | Otto | 241/300 X |
| 3,043,820 | 7/1962 | Kreible | 260/89.5 |
| 3,142,138 | 7/1964 | Kean et al. | 51/206 |
| 2,393,424 | 1/1946 | Selch | 408/226 X |

FOREIGN PATENTS OR APPLICATIONS

| | | | |
|---|---|---|---|
| 519,256 | 12/1955 | Canada | 29/95 |

OTHER PUBLICATIONS
Publication: Machinery, May 1961, Article Entitled "Take a Good Look at Ceramics," by W. M. Wheildon, page 119 only.
Publication: British Plastics, Nov. 1948, Article Entitled "Araldite" by C. J. Moss, pages 524 & 525 only.

*Primary Examiner*—Francis S. Husar
*Attorney*—Popper, Bain, Bobis & Gilfillan

[57] ABSTRACT

A composite bit or drill having a material working section adhesively connected to an enlarged gripping section. The material working section includes generally a cutting, grinding or finishing portion and continuous therewith a shank portion and is made of hard, abrasion resistant, heat resistant, durable alloys. The gripping section has a relatively large mass and large outer diameter with respect to the material working section and has an accurately formed longitudinal bore therein for receiving the shank of the material working section the adhesive connection between the material working section and the gripping section will not prevent heat transfer between these elements. Adhesive materials for connecting the cutting section to the gripping section may be anaerobic adhesives, epoxy adhesives, cyanoacrylate adhesives and other compounds depending on the bond strength required and the heat transfer characteristics established between the material working section, the gripping section of the bit and the chucking means for holding the composite bit or drill.

Additionally, for forming a composite bit or drill there is provided a gripping element or jacket having a longitudinal bore formed to receive drills or the like type tools within a predetermined range of sizes to permit the bit or drill to be fitted and adhesively connected in the bored jacket elements in any type of work shop where such tools are used.

11 Claims, 8 Drawing Figures

PATENTED AUG 7 1973 3,751,176

JOHN VON HOLLEN
INVENTOR.

BY
Popper, Bain, Bobis & Gilfillan
Attys

PATENTED AUG 7 1973 3,751,176

JOHN VON HOLLEN
INVENTOR.

BY
Popper, Bain, Bobis + Gilfillan
Attys

COMPOSITE BIT

BACKGROUND OF THE INVENTION

It is well recognized in the tool industry that in many drilling, reaming, grinding, polishing, burnishing and the like applications the requirements of the material working section of the bit that cuts, reams, grinds polishes, burnishes, etc., differs from the gripping section requirements of the same bit. This is particularly the case where hard abrasion resistant, heat resistant, rigid, tough and durable materials are required for the material working section of the bit.

This is best illustrated for the case of conventional small high speed steel twist drills in a range from (0.010 inch) to (1/16 inch) in diameter.

In order to extend the life of such drills, it has become common practice to manufacture these drills from cobalt or tungsten steels, tungsten carbide and the like special alloys. Since each such drill which includes the cutting end, the flutes and the shank are for manufacturing convenience and costs made of a single unit or piece the shank portion by which the drill is held during use will possess the properties and characteristics of the material from which the entire drill is made and the function of the shank portion is largely ignored.

As a result, conventional multi-jaw drill chucks require meticulous chuck adjusting for the accurate centering of such drills to insure that the shank portion is not in or does not slip into the space between two jaws when the chuck is tightened. If such misalignment does occur or goes unrecognized damage may occur both by drill breakage and to the work piece on which the drill is being used.

Additionally, when the shank is made of harder materials than the jaws of the chuck, the jaws wear and replacement is required to maintain the accuracy and functional characteristic of the chuck.

In the prior art various devices have been developed for overcoming these problems. For example, one known technique of manufacturing very small drills is to make the unit with a fluted portion and a continuous shank portion wherein the shank portion has a relatively larger diameter than the diameter of the fluted portion of the drill. However, this makes such small drills relatively costly particularly where special materials are needed to meet the working requirements of the materials on which the drills will be used.

Another technique illustrated for example in U.S. Pat. No. 1,977,845 at FIG. 9 therein is to weld the material working portion of a drill to an enlarged shank portion to provide a composite drill or bit having the desired cutting or grinding characteristics and the gripping characteristics which overcome the problems abovementioned. However, due to the elevation of the temperature required to braze or weld the material working section and the gripping section of the bit or drill together the temper of the material more particularly that of the steel of the material working or cutting edge of the drill is effected and this in turn reduces the life of the material working portion of the bit or drill. Further, the brazing or welding technique requires compatible materials in both the material working portion and the shank portion of the bit or drill for proper brazing or welding of these portions of the drill.

Other techniques have been attempted such as the mechanical interlocking of the material working section and the gripping section such as is shown in U.S. Pat. Nos. 1,285,589 and 879,631.

The present invention meets the basic problem and the problems of the prior art devices as above set forth and provides an improved composite bit or drill by dividing the functions of the drill, bit, bur, grinder, polisher and the like unit into the material working and material removal portion and shank or gripping portion making these functional portions into independent elements with the desired characteristics to meet the requirements for which they will be used and then joining the independent elements by a suitable adhesive technique as will be described hereinafter.

For purposes of illustrating the nature of the invention as broadly outlined above, the parameters for the elements as above defined can be illustrated with respect to very small composite drills.

It will be understood that such illustration shall not limit the invention herein and that the broad concept is equally applicable to larger drills, to small or large burs, to small or large grinding bits, to polishing bits, etc. This is the case because the basic problems of the special nature of the materials of which such bits or elements are made and the importance of proper gripping and holding of the bit or element when it is in use remains the same.

Thus, in a composite drill in accordance with the invention the material working and material removing portion or element may be any type of conventional straight shank drill or pivot drill, i.e., one with a shank having a diameter larger than the fluted portion of the drill. These drills are commercially available and can be selected for the desired conditions of abrasion resistance, heat resistance, hardness, rigidity, etc.

The parameters for the gripping portion are, however, multiple and may be varied depending on the particular ultimate advantage to be obtained as will be made clear in the description with respect to the drawings which follow.

Broadly, however, the gripping section may have at least one or more of the following qualities:

a. Adequate size — it must have a diameter such that conventional chucks can easily grasp and center the gripping section. A composite drill with an adequately sized gripping section can increase conventional chucks, such as a Jacobs chuck which is limited to shanks no smaller than 0.020 inch; by more than 50 small drill sizes;

b. Malleability — to permit the gripping section to conform to the surface of the chucks jaws and prevents them from wearing or becoming damaged as occurs with the harder high speed steel drills;

c. High thermal conductivity — to remove heat of friction from the material working or cutting end of the drill;

d. High thermal capacitance — to aid in the removal or transfer of the heat from the material working and material removal section. In this respect the length and diameter of the gripping section will help to vary or provide the necessary mass or heat sink for faster heat removal.

e. Low elastic modulous — for ease in flexing without permanent deformation. This, of course, must be balanced against ability to transmit sufficient torque to drive the material working or cutting end through the work piece on which the composite drill will be used.

Last to permit — this dual function of the elements—they must be joined by some practical means and in the present invention this is accomplished by adhesive bonding.

The parameters for the adhesive include at least the following:

a. High sheer strength to withstand torque;

b. Chemical inertness to prevent damage by coolants and lubricants, if they are needed for use with the composite drill;

c. Heat resistance to withstand heat generated by friction when the composite drill is being used. This requirement can be reduced if thermal capacitance and conductivity of the gripping element are effective in preventing heat build up and/or if the composite drill is used with a suitable coolant;

d. shock and vibration resistance to withstand the drilling operation, and e. good wetting ability and fast curing to aid in the ease of assembling the independent elements.

A conventional or pivot drill connected to a gripping section with the above parameters by an adhesive with the functional characteristics set forth will provide a composite drill which releases the stresses of machine run-out by flexing and thereby prevents these stresses from being transmitted to the wall of the hole being drilled in the work piece by the composite tool.

Further, the composite tool so found will conduct the heat generated by friction away from the cutting site in the work piece before it can damage the cutting edge of the composite drill or soften the walls of the hole being drilled in the work piece. This occurs because the relatively large mass of the gripping member serves as a heat sink and as a heat conducting path to the larger heat sink of the chuck.

A composite drill made in accordance with the above principles will provide improved hole tolerance, function without coolant or with less coolant than heretofore required, will permit satisfactory use of lower temperature alloys in the material working end of the drill thus reducing manufacturing cost, will permit the use of offhand power tools and less precise bench and floor drill presses for small hole drilling, reduce drill breakage, increase the life of the drill with less sharpening or no sharpening whatsoever, facilitate and abet the chucking and holding of the drill members, reduce chuck jaw wear and replacement and while it cannot be made at less cost than a corresponding size conventional, it will be of far greater use and value because of the improved functional characteristics.

SUMMARY OF THE INVENTION

Thus, the present invention covers a composite bit, bur, drill and the like device comprising a material working means having a shank portion, a gripping means having a longitudinal bore formed therein the diameter of which is slightly larger than the outer diameter of said shank portion so that in assembled position said shank portion will have a close fit relation with said longitudinal bore, and adhesive means between the outer surface of the shank portion and the inner wall of said longitudinal bore bonding the material working means in said gripping means.

Additionally, the present invention contemplates a method for assembling a composite tool for any desired work shop operation by providing the independent elements thereof in the form of the longitudinally bored gripping means, the adhesive and a sized rotary bit, bur, drill, grinder, polisher or like rotary element having a shank adapted to fit the longitudinal bore of said jacket element together with instructions for the assembly thereof.

Additionally, the present invention contemplates the methods of adhesively affixing high speed steel or tungsten carbide straight shank or pivot drills having a relatively small diameter in enlarged jacketed gripping means to provide a composite bit or drill structure particularly adapted for small hole drilling.

OBJECTS AND ADVANTAGES

Accordingly, it is an object of the present invention to provide a composite bit or drill having a jacketed gripping section adapted to simplify the chucking and holding of said bit or drill.

It is another object of the present invention to provide a composite bit or drill in which the material working section and the gripping section can be suitably tailored to meet the requirements of the material working section and to improve the conditions of operation under which the composite bit or drill is utilized.

It is another object of the present invention to provide a composite bit or drill in which the material working section and gripping section are so tailored that advantageous heat transfer characteristics are provided between the material working section of the bit or drill, the gripping section and the chucking element for the bit or drill.

It is still another object of the present invention to provide a composite bit or drill in which the material working section and gripping section are so selected and tailored in assembly that they compensate for run-out characteristics of the chucking assemblies and the driving means of the tools in which such composite bits or drills are utilized.

These and other objects and advantages of the invention will become evident from the following description with reference to the accompanying drawings in which.

Figure 1:
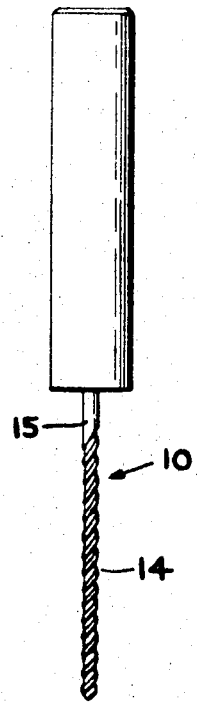
FIG. 1 is a side elevation of one form of composite drill in accordance with the present invention.
Figure 2:
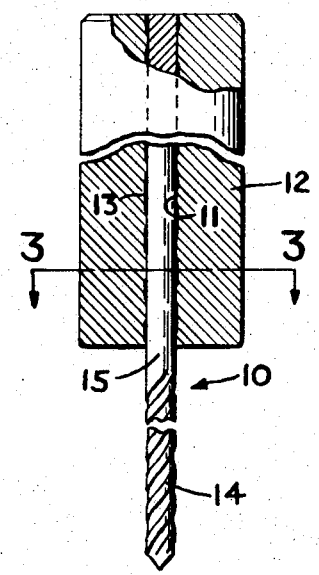
FIG. 2 is an enlarged view of the form of the invention shown in FIG. 1 partly in vertical section.
Figure 3:
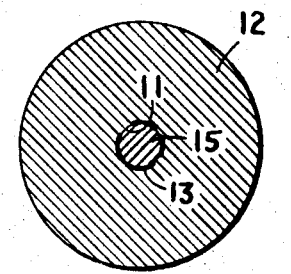
FIG. 3 is a cross section taken on line 3—3 of FIG. 2.
Figure 4:
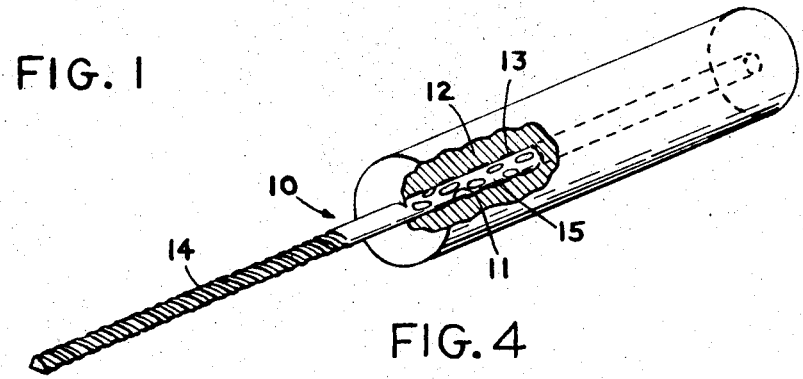
FIG. 4 is a perspective view of the form of the invention shown in FIG. 1 partly broken away to show the adhesive bonding of the drill in assembled position in the jacket element.

The present invention as above indicated can be illustrated in the form of a composite drill and the figures of the drawings show two forms of composite drill in accordance with the present invention.

Accordingly, referring to the drawings FIGS. 1 to 4 illustrate a composite drill utilizing a straight shank high speed drill generally designated 10 adhesively mounted or connected as at 11 in an end to end longitudinal bore 12 of a jacket element 13.

The drill member 10 is the material working portion of the composite drill and the jacket element, the gripping portion.

The drill member 10 is a standard straight shank drill purchasable on the open market which has been cut in the conventional manner so that the fluted portion 14 as distinguished from the shank portion 15 will have a predetermined length.

The shank portion 15 will have at least sufficient length for the surface conditions at the point where the adhesive connection 11 is established between the shank 15 and the longitudinal bore 12 so that the adhesive connection will at least equal or preferably exceed the breaking strength of the drill member 10 connected in the jacketed element 13.

Breaking strength as used herein means the degree of applied torque required to break a drill or cutting bit when one end is fixedly held and the other end gripped and rotated. Breaking strength for a given drill or range of drills can be easily determined as will be understood by those skilled in the tool art.

Additionally, there is printed information in the art relative maximum torque that bonds made of certain adhesives such as anaerobic adhesives can transmit in terms of the shear strength of the adhesive, the given amount of surface area being bonded, the surface characteristics of the respective elements being bonded and the clearance between these surfaces.

Accordingly, once the breaking strength of a given drill or the minimum breaking strength for a given range of drill sizes is determined then taking into account the diameter of the shank of any given drill, the length of the surfaces to be bonded and the surface characteristics of the drill and the inner wall of the longitudinal bore and most important the clearance between the outer surface of the drill and the inner wall of the longitudinal bore, a suitable adhesive can be selected to accomplish the desired bonding of these elements.

Anaerobic adhesives are one type of adhesive that have the physical characteristics of shear strength and set up time to create the desired bond between the outer surface of the shank 15 and the inner wall of the longitudinal bore 12. Such anaerobic adhesives are described in U. S. Pat. Nos. 3,041,322 and 3,043,820 and other patents and are sold on the open market by Locktite Corporation under the trademark LOCKTITE.

Where a good thermal path can be established from the drill to the jacket element to the chuck or other means for holding the composite drill as is described hereinafter with respect to the form of the invention shown in FIGS. 5 to 8 of the drawings then epoxy resin adhesives or cyanoacrylate adhesives may be utilized and these too are purchasable on the open market.

In regard to the finishes on the interengaging surfaces it has been found that the conventional machine finish of the outer surface of the shank 15 of the drill 10 and the inner wall of the longitudinal bore 12 are of sufficiently uneven texture that they aid in effecting the desired adhesive bonding of these parts provided that the clearance between the outer surface of the drill 10 and the inner wall of the longitudinal bore 11 does not exceed a "push fit" clearance.

"Push fit" clearance as used herein means that the shank 15 of drill 10 must be forced into the longitudinal bore 12 by substantial manual pressure in order to affect assembly thereof. It is intended that the fit should be less than a "forced fit" as is understood in the art of tooling and clearances.

It will be noted with reference to the drawings that the figures illustrate a discontinuous coating of the adhesive. This is a side advantage of the uneven texture of the interengaging surfaces in that it provides metal to metal contact along the surfaces of those members which serve as a path through which the heat of the friction can be dissipated when the drill is being used.

In the case of relatively small diameter conventional straight shank drills, the problem of achieving the desired bond strength is at once presented because of the limitations on machining equipment capable of drilling a longitudinal bore 12 accurately in the jacket element 12 beyond a certain depth.

Accordingly, instead of a longitudinal bore being drilled into one end of the jacket element, the jacket element 13 as illustrated in FIGS. 1 to 4 of the drawings will be made of drawn tubing.

Thus, as will be understood by those skilled in the art, it is possible to prepare tubing made of a given desired material with a given inner diameter to meet the clearance requirements for the size of the shank of the drill. The tubing may be cut into jacket element lengths which jacket element lengths will have a longitudinal bore from end to end as shown in FIGS. 1 to 4 into which the drill shank can be fitted to any desired depth without modifying the drill shank.

The requirements for the desired bond strength between the adhesive connection between the outer surface of the drill shank 15 and the inner wall of the longitudinal bore 12 can be calculated and it will only be necessary to insure that the length of the interengaging surfaces being bonded exceeds the minimum length to produce the desired bond strength for the clearance between the outer surface of the drill shank and the inner wall of the longitudinal bore and the surface conditions of these interengaging surfaces.

It is thought clear that the advantage of this form of the invention is that the adhesively bonded surface areas can be easily increased so as to exceed the minimum surface areas for providing the required bonding of these elements of the drill member.

Conversely, the disadvantage is that for each size drill or for each range of drill sizes that will fall within given clearance limits a different size of drawn tubing will be required to provide the lengths of the jacket elements needed to make the composite drill. This problem, however, is met by the alternate form of composite drill shown in FIGS. 5 to 8 of the drawings hereinafter to be described.

The jacket element 13 is a cylindrical element having an outer diameter which is relatively large compared to the outer diameter of the shank portion 15 of the drill 10. In order to make the jacket element adaptable and easy to be gripped by a chuck or the like type means, it will be made of a relatively malleable material such as a copper base alloy with the properties and characteristic for the gripping section of a composite tool in accordance with the present invention as above set forth.

In setting the drill 10 into the longitudinal bore the shank 15 will extend beyond the end of the jacket element 13 as shown in FIGS. 1 to 4 so as to permit the fluted section 14 to be fully visible to the operator when the composite drill is used for any given purpose. Stated another way, the fluted section 14 is spaced from the end of the jacket element 13 so the operator using the composite drill will be able to view the fluting beyond the edges of the jacket element 13.

The length of the jacket element 12 and the variety of materials from which it can be formed will depend on the application to which the composite drill will be applied and because the material of the drill and the jacket elements can differ from each other the present invention provides a simple means to tailor the composite drill for a variety of capabilities which meet and overcome many material working problems.

METHOD OF ASSEMBLY

In order to assemble the elements of the composite drill, the application to which the drill will be applied is generally first considered and in accordance therewith the materials of the drill and the jacket are selected for the desired application. The drill, for example, can be made of high quality tungsten and cobalt steel alloys, tungsten carbide or similar long life cutting materials and the jacket may be made of steel, or a copper base alloy or any relatively malleable material which is easily gripped by a chuck or similar device for holding the composite drill and strong enough to deliver the required torque without permanent deformation.

In the case of the jacket element, the relative rigidity of the composite drill can be regulated by the material selected. For example, if the jacket element 13 is made of a copper base alloy or similar material with a low coefficient of elasticity, it will provide a less rigid composite drill than will be obtainable with a jacket element made of a steel alloy material. The ability to regulate the materials of which the drill 10 and the jacket element 13 are made and the fact that these elements can be bonded together provides means for making a more versatile drill and increases the applications thereof as is illustrated more fully below.

Once the materials are selected and the diameter of the drill 10 to be bonded is determined a jacket element 13 with a suitably sized longitudinal bore 12 therein to provide the desired clearance with the drill shank 15 will be selected. A longitudinal bore 12 will be selected to furnish the desired "push fit" above mentioned and thus provide the close clearance between the outer surface of the drill shank 15 and the inner wall of the longitudinal bore 12 which is needed to provide an adhesive bond with maximum torque for the length and surface characteristics of the drill shank and the inner wall of the longitudinal bore.

As above stated the conventional finish under a "push fit" relationship of the interengaging surfaces will be adequate. However, if it is desired or necessary to increase the maximum strength or load carrying capacity of the adhesive bond then these surfaces can be etched or abraded by any suitable technique so as to roughen these surfaces and thus increase the surface area which in turn will increase the strength of the adhesive bond.

When the drill and the jacket element are ready for assembly the shank 15 of the drill is coated with the preselected adhesive and then fitted into engagement in the longitudinal bore 12 of the jacket element.

When the elements have been fitted together the adhesive may be cured in any number of ways depending upon which adhesive is selected. For example, if an anaerobic adhesive is selected, this type adhesive may be cured at ambient temperature over the period of time for the particular adhesive selected. Alternatively, the parts may be subjected to a low elevational temperature up to approximately 300° F. for a very short period of time and this will act to set the adhesive and create the desired bond between the interengaging surfaces.

Similarly, if a thermosetting resin or other type adhesive is used then these parts are subjected to heating at the same relatively low temperature until the parts are well bonded in assembled position.

After the bond has been completed the drill is at once ready for use and will function for the desired application to which it is to be put merely by placing the drill in a suitable chucking or holding means as was done with the corresponding prior art drills, however, by reason of the enlarged diameter of the jacket elements the problems of chucking and holding the composite drill in position for use can be done manually and without excessive manipulation. The changing of drills is also simplified.

FIGS. 5 to 8 FORM OF THE INVENTION

In the form of the invention shown in FIGS. 1 to 4 of the drawings it was pointed out that even with precision deilling equipment it is very difficult to drill the longitudinal bore in the jacket element for any great length with accuracy and this is a limiting condition where the composite drill is made with a straight shank drill particular in very small drills because of the limited area that will be available for the adhesive bonding of the elements of the composite drill.

Conventional automatic screw and the like drilling machines, however, are capable of drilling longitudinal bores accurately without special provisions that raise the cost, to at least five times the diameter of the hole being drilled.

Therefore, drills which have shanks with diameters which fall within the precision capabilities of such drilling equipment provide a ready alternative to the form of the invention shown in FIGS. 1 to 4 and above described in that such drills with larger shanks may be combined with jacket elements in which the longitudinal bores will be drilled.

FIGS. 5 to 8 show this alternate form of the present invention utilizing a type of twist drill, known in the trade as a pivot drill. Such drills which are purchasable on the open market and represent one of the efforts of the prior art to meet and overcome the chucking problems as above mentioned. Such pivot drills include the conventional fluting of straight shank drills but have an enlarged shank portion continuous with the fluting and this increased diameter provides a sufficient increase in area to permit this type twist drill to be adhesively mounted in a drilled longitudinal bore because the longitudinal bore can be drilled with the necessary accuracy for these enlarged shanks.

It is thought clear that this form of the invention is particularly adaptable for extremely small drills but that the principle could be applied to straight shanks, burs, bits drills, etc. having the same or larger diameters.

Thus, FIGS. 5 to 8 show a drill member generally designated 30 which is adhesively connected in the longitudinal bore 31 formed in an enlarged jacket element 22 by means of a suitable adhesive 33.

Figures 5, 6, 7:
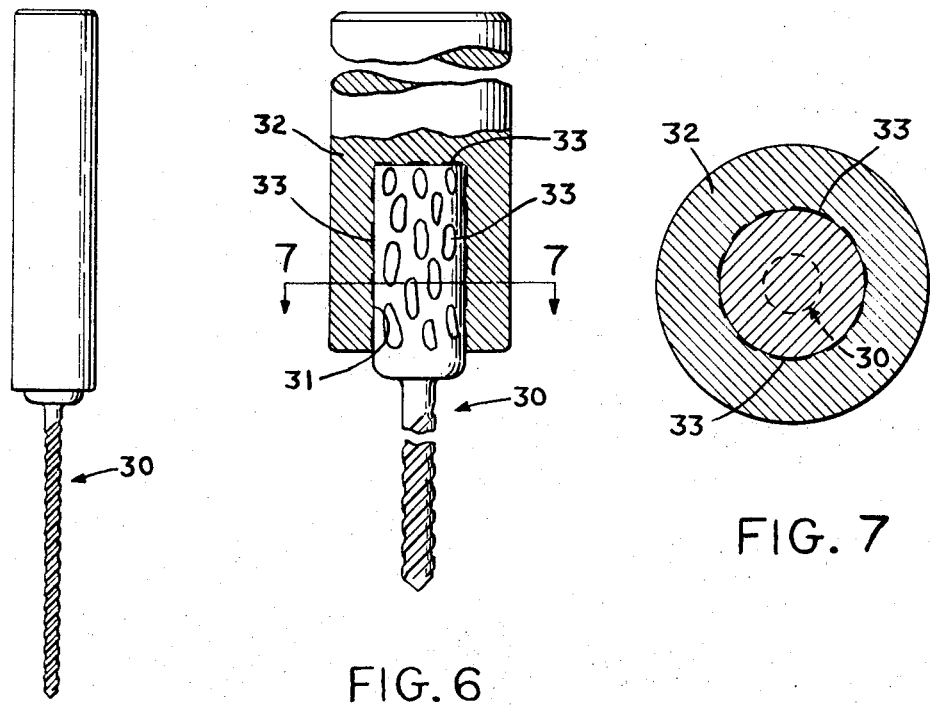
FIG. 5 is a side elevational view of another form of composite drill in accordance with the present invention.
FIG. 6 is an enlarged view of the form of the invention shown in FIG. 5 partly in vertical section.
FIG. 7 is a cross section taken on line 7—7 of FIG. 6.
Figure 8:
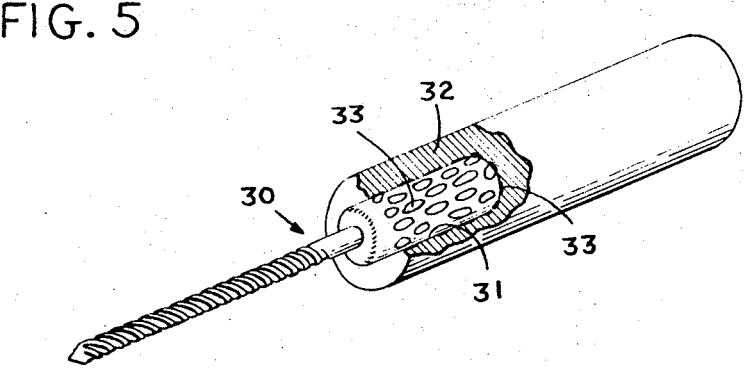
FIG. 8 is a perspective view of the form of the invention shown in FIG. 5 partly broken away to show the adhesive bonding of the drill in assembled position in the jacket gripping element.

The drill 30, however, in this form of the inveniton includes the fluted portion 34 and a stepped shank portion 35 continuous therewith which as indicated in FIGS. 6 and 8 will have an enlarged diameter greater than the diameter of the fluted portion 34 of the drill but lesser than the diameter of the jacket element 32.

As above indicated, these drills are adapted for use in the present invention in that they provide a simple means for increasing the available surface area which can be bonded in the longitudinal bore 31 which as indicated above can only be drilled accurately and economically to a depth of approximately five times that of the diameter of the shank.

With the increased surface area the maximum strength or coupling capacity of the adhesive bond can be materially increased and thus, the problems of meeting the bond strength requirements for a composite drill are more easily met by the structure shown in FIGS. 5 to 8 of the drawings.

Additionally, because of the enlarged diameter of the shank it is possible to space the end of the jacket element a greater distance from the upper end of the fluted portion 34 of the drill so as to provide a double step construction as is illustrated in FIGS. 6 and 8 to 9 of the drawings.

The increased mass of these stepped shank twist drills when adhesively bonded in the longitudinal bore of the jacket element gives improved heat transfer characteristics in that it provides a greater heat sink and wider heat path to permit the heat to be dissipated more quickly and to allow the drill to run cooler than the known prior art devices and this will help to increase the useful life of the drill.

Additionally, the stepped shank drills permit better control of elasticity or the related rigidity characteristics of the composite drill so that these drills can even improve the functional operation of the tools or machines in which they are used.

For example, one illustration of this is the use of these drills to compensate for "run out" which is present in varying degrees in all rotating machines. This can be best illustrated by the following examples:

EXAMPLE I

Composite drills used
0.010 inch high speed steel alloy drill with copper base alloy jacket
0.040 inch high speed steel alloy drill with copper base alloy jacket Each respective drill was mounted in an Albrecht ½ inch chuck on a bridgeport milling machine having 0.008 inch runout true indicator reading at the drill shank.

10 holes were drilled with each size drill and measured with reflexometer equipment and the measurements indicated that for each of the drill sizes tested the diameter of the drilled hole differed from the measured size of the composite drill by less than 0.0005 inch ($5 \times 10^{-4}$) and the holes were perfectly round.

The composite drill therefore absorbed almost the entire "run out" of the machine in which it was mounted.

EXAMPLE II

Composite drills used
0.010 inch High speed steel alloy drill with copper base alloy jacket
0.040 inch High speed steel alloy drill with copper base alloy jacket Each respective drill was mounted in a Jacobs chuck of a four spindle Allan Drill Press.

The true indicator reading of the measured run out of the drill press at the chuck was 0.024 inch ($24 \times 10^{-3}$).

10 holes were drilled with each size drill and measured with reflexometer equipment and the measurements indicated that for each of the drill sizes tested, the diameter of the drilled hole differed from the measured size of the composite drill by less than 0.001 inch ($1 \times 10^{-3}$) and the holes were perfectly round.

The composite drill therefore absorbed almost the entire "run out" of the machine in which it was mounted.

Other applications and advantages of the construction can be illustrated such as thermal conductivity which was mentioned briefly above.

The relatively large mass of the jacket element or gripping section acts as a heat sink and as a conductor of the heat to the chuck which is a still greater mass. Additionally if a copper base alloy is used conduction of heat will occur at twice the rate than can be achieved with a corresponding steel alloy jacket element or gripping member.

The construction more particularly of the form of the invention shown in FIGS. 5 to 8 provides a thermal path to the chuck which in turn serves as a massive heat sink. Thus, the drill can be used without a coolant and will still retain its cutting edge. Additionally, because of the method of construction and assembly the thermal conductivity can be increased by varying the material of the jacket element as by making it of beryllium copper which is a better heat conducter than other copper alloys.

Similarly malleability can be regulated to increase or improve the gripping and holding quality of the chuck.

The two part construction of the composite drill to permit the use of a more expensive material for the drill and a relatively inexpensive material for the jacket will obviously provide a cost advantage in the manufacture of drills of this type and the thermal conductivity characteristics are desirable because most adhesives weaken with the heat. Thus, if the heat can be sufficiently dissipated so as to eliminate or supplement the action of a cooling fluid it is possible to use a wider variety of adhesives in addition to those above illustrated.

The enlarged diameter of the jacket element extends the capacity of most chucks, particularly with respect to small sized drills, by forty or more sizes and speeds and simplifies drill changing and handling as contrasted with the meticulous chuck adjusting problems of the prior art devices.

It will be understood that the invention is not to be limited to the specific construction or arrangement of parts shown but that they may be widely modified within the invention defined by the claims.

What is claimed is:
1. A composite tool comprising:
   a. material working means including, a work portion, and a shank portion with a preselected diameter,
   b. means forming a gripping section made of a nonferrous material with the desired modulus of elasticity and relatively high thermal conductivity, c. said gripping section means having a larger outer diameter than the diameter of the shank portion of the material working means, d. said gripping means having an accurately formed longitudinal bore therein, sized with respect to the preselected diameter of the shank portion of the material working means to provide push fit engagement between said shank portion and the wall of the longitudinal bore and to provide limited clearance between spaced random portions thereof to insure high bonding strength between the material working means and the gripping section when these elements are in assembled relationship, e. an adhesive means bonding the spaced random portion of the surfaces of the said shank portion and the wall of said longitudinal bore having clearance therebetween so that the remaining interengaging surfaces will transmit a relatively high rate of heat flow away from the working portion of material working means due to the combined mass of the gripping section and the shank portion of the material working means.

2. In a composite bit as claimed in claim 1 wherein the longitudinal bore extends at least into one end of the gripping section and has a predetermined minimum length as a function of the diameter of the shank of the material working means and the available bond strength of the adhesive.

3. In a composite tool as claimed in claim 1 wherein the material working means is a conventional straight shank twist drill, and the shank of said twist drill having a sufficient length thereof in engagement with the wall of the longitudinal bore to provide for the required adhesive bonding to connect the shank of the straight shank twist drill in the gripping section means.

4. In a composite tool as claimed in claim 1 wherein the material working means is a pivot type twist drill including, an enlarged diameter shank, and the longitudinal bore in said gripping section means having sufficient length to provide for the required adhesive bonding of the pivot type twist drill to the gripping section means when the enlarged diameter shank thereof is mounted in the longitudinal bore of the gripping section means.

5. In a composite tool as claimed in claim 1 wherein the adhesive is an anaerobic adhesive.

6. In a composite tool as claimed in claim 1 wherein the adhesive is an epoxy adhesive.

7. In a composite tool as claimed in claim 1 wherein the adhesive is a cyanoacrylate adhesive.

8. In a composite tool as claimed in claim 3 wherein the gripping section means is made of drawn tubing to form the longitudinal bore.

9. In a composite tool as claimed in claim 1 wherein the gripping section is made of a material from the group copper alloys, aluminum alloys and silver alloys.

10. In a composite tool as claimed in claim 2 wherein the adhesive is an anaerobic adhesive.

11. In a composite tool as claimed in claim 10 wherein the gripping section is made of a material from the group copper alloys, aluminum alloys and silver alloys.

* * * * *